US012615254B2

(12) United States Patent     (10) Patent No.:   US 12,615,254 B2

Patel et al.     (45) Date of Patent:    Apr. 28, 2026

(54) METHODS AND SYSTEMS FOR IDENTIFYING COMMUNICATION SOURCES ACROSS CHANNELS

(71) Applicant: LIVEPERSON, INC., New York, NY (US)

(72) Inventors: Neelima Patel, Redmond, WA (US); Shaun Yelle, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 18/791,630

(22) Filed: Aug. 1, 2024

(65) Prior Publication Data

US 2025/0047665 A1     Feb. 6, 2025

Related U.S. Application Data

(60) Provisional application No. 63/530,298, filed on Aug. 2, 2023.

(51) Int. Cl.
    *H04L 9/40*        (2022.01)
    *H04L 67/306*      (2022.01)

(52) U.S. Cl.
    CPC ........ *H04L 63/0861* (2013.01); *H04L 67/306* (2013.01)

(58) Field of Classification Search
    CPC ........................... H04L 63/0861; H04L 67/306
    USPC ........................................................... 726/7
    See application file for complete search history.

(56) References Cited

U.S. PATENT DOCUMENTS

| | | | |
|---|---|---|---|
| 2014/0143666 A1 | 5/2014 | Kennedy et al. | |
| 2016/0050203 A1* | 2/2016 | Hefetz | H04L 51/18 |
| | | | 726/7 |
| 2018/0349583 A1* | 12/2018 | Turgeman | H04L 63/0861 |
| 2019/0340636 A1* | 11/2019 | Agrawal | G06Q 30/0236 |
| 2019/0394195 A1* | 12/2019 | Chari | H04L 63/08 |
| 2020/0374394 A1 | 11/2020 | Karp et al. | |
| 2021/0058395 A1* | 2/2021 | Jakobsson | H04L 67/306 |
| 2021/0110014 A1* | 4/2021 | Turgeman | G06F 11/3419 |
| 2023/0169274 A1 | 6/2023 | Cohen et al. | |
| 2024/0005386 A1* | 1/2024 | Thurairatnam | G06Q 20/4014 |

OTHER PUBLICATIONS

International Search Report and Written Opinion of Nov. 22, 2024 for PCT Application No. PCT/US2024/040501, 11 pages.

\* cited by examiner

*Primary Examiner* — Liang Che A Wang

(74) *Attorney, Agent, or Firm* — POLSINELLI LLP

(57) ABSTRACT

Systems and method are provided for identifying a source of communications for improved communications. A computing device may receive a communication from a first device over a first time interval and extract a set of features from the communication. The features may correspond to characteristics indicative of how the communication was generated over the first time interval. The computing device may execute a machine-learning model using the set of features to generate a predicted identity associated with a source of the communication. A response can be generated based on the predicted identify and transmitted to the first device.

20 Claims, 5 Drawing Sheets

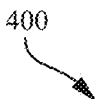

400

---

Receiving, over a first time interval, a communication via a communication channel from a first device
404

$\downarrow$

Extracting a set of features from the communication, wherein the features correspond to characteristics indicative of how portions of the communication are generated by the user device over the first time interval
408

$\downarrow$

Executing a machine-learning model using the set of features, the machine-learning model generating a predicted identity associated with a source of the communication
412

$\downarrow$

Generating an interface based on the predicted identity of the source, the interface including additional information associated with the source of the communication
416

$\downarrow$

Transmitting a response to the communication via the communication channel, the response being tailored to the source based on the additional information of the interface
420

FIG. 4

METHODS AND SYSTEMS FOR IDENTIFYING COMMUNICATION SOURCES ACROSS CHANNELS

CROSS REFERENCE TO RELATED APPLICATIONS

This patent application claims the priority benefit of U.S. provisional patent application No. 63/530,298 filed Aug. 2, 2023, which is incorporated by reference herein in its entirety.

TECHNICAL FIELD

This disclosure generally relates to identifying a source of communications; and more specifically to identifying a source of communications received from varying communication channels.

BACKGROUND

Automating devices and/or processes may increase the operating efficiency of some systems. As a result, many such systems attempt to implement various levels of automation. In some instances, such as when the device and/or process of a system are homogenous, an automation solution that works for one device and/or process may similarly be applied to other such devices and/or processes. When the devices and/or processes of a system are not homogeneous, an automated solution applicable to one device may not be operable for other such devices. In those instances, some systems may generate generic automated solutions that can be applied to the non-homogenous devices and/or processes. Generic automation solutions may be configured to automate aspects of such devices and/or processes that may be common among the devices and/or processes. Yet, generic automation solutions may induce hardware and/or software faults in devices and/or processes that may not be common within the system and/or devices and/or processes that have differing configurations. For example, a resource library (e.g., such as an application programming interface, etc.) may be usable to automatically obtain data from a set of remote storage devices within a system. The resource library may only be operable when the set ore remote storage devices are homogenous (e.g., in hardware and/or software configuration, etc.). If not, and the resource library may cause a system fault when attempting to access a disparate remote storage device (e.g., such as an exception, interrupt, etc.). Systems that implement large quantities of heterogenous device and/or processes (i.e., most systems in operation), may not be suitable for generic automation solutions.

SUMMARY

Methods and systems are described herein for identifying a source of communications for improved communications. The methods can include receiving, over a first time interval, a communication via a first communication channel from a first device; extracting a set of features from the communication, wherein features of the set of features correspond to characteristics indicative of how portions of the communication are generated by the client device over the first time interval; executing a machine-learning model using the set of features, the machine-learning model generating a predicted identity associated with a source of the communication; generating an interface based on the predicted identity of the source, the interface including additional information associated with the source of the communication; and transmitting a response to the communication via the first communication channel, the response being tailored to the source based on the additional information of the interface.

Systems are described herein for identifying a source of communications for improved communications. The systems include one or more processors and a non-transitory computer-readable medium storing instructions that, when executed by the one or more processors, cause the one or more processors to perform any of the methods as previously described.

Non-transitory computer-readable media are described herein for storing instructions that, when executed by the one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

FIG. 4 illustrates a flowchart of example process of identifying a source of a communication and using the identification to generate tailored responses according to aspects of the present disclosure.

DETAILED DESCRIPTION

Figure 1:
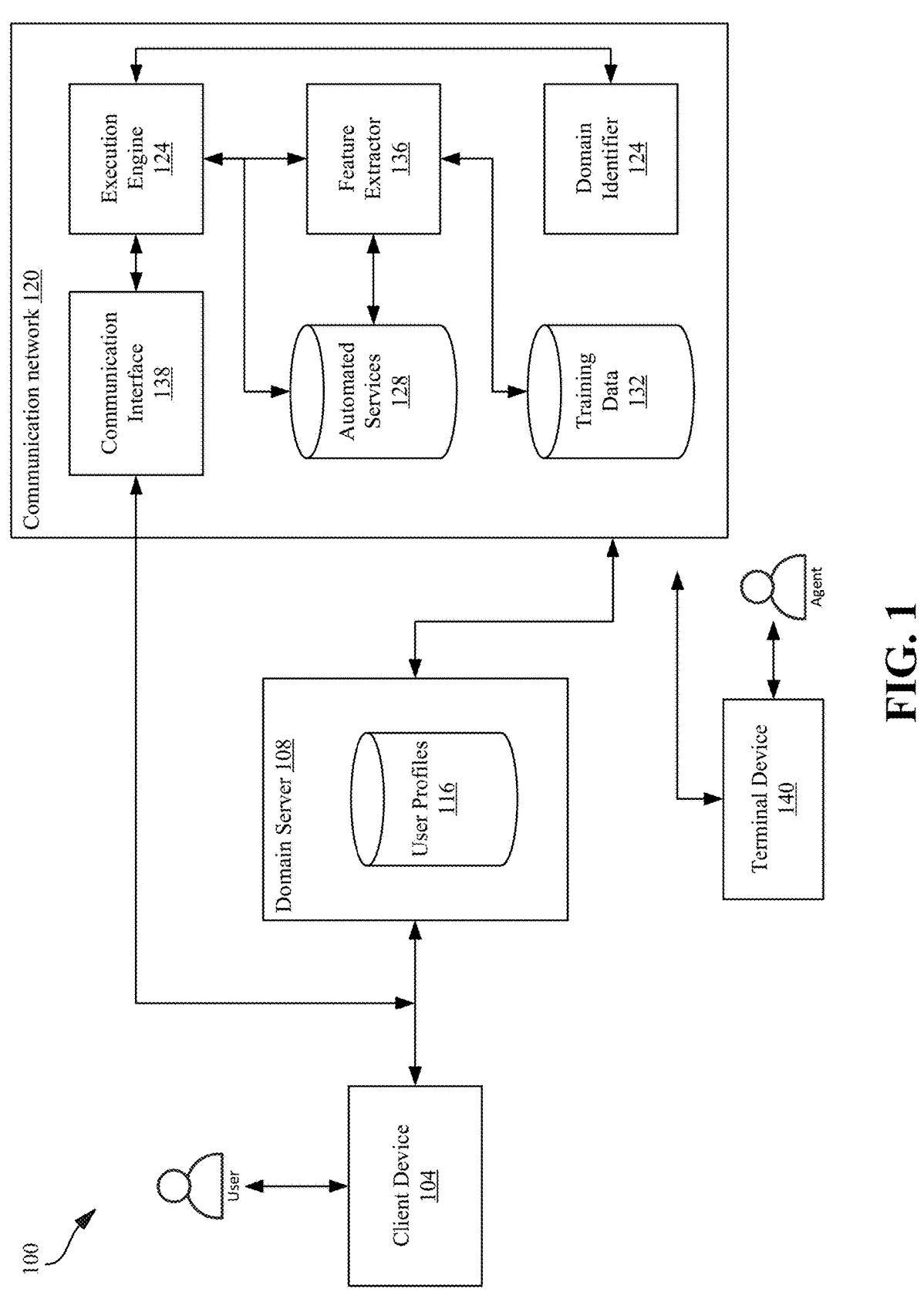
FIG. 1 illustrates an example communication network configured to identify a source associated with incoming communications usable to improve a communication session between the source and the communication network according to aspects of the present disclosure.

The present disclosure includes systems and methods for identifying a source of received communications. A computing device may establish a connection with a sever operated by a domain using a first communication channel. The computing device may communicate with the sever to execute functions of the sever, communicate with automated services (e.g., bots, etc.), establish a connection with one or more terminal devices associated with the domain, etc. The services provided by the sever may be based on the computing devices connected to the server (e.g., based on the processing capabilities of the computing device, a device type, a device location, etc.) or based on the user operating the computing device. If the user is unknown, some services of the server may be unavailable or may cause an error if executed (e.g., such as when the computing device lacks sufficient processing resources, etc.). The server may use information received over the connection to identify the computing device and/or the user thereof and configure the services provided by the server. For example, the server may train automated services for the particular user, establish connects with particular terminal devices or agents, etc.

The server may characterize communication entry (e.g., the process in which communications are provided by a user of a computing device to the computing device) along with the communication to generate a profile that may be usable to identify users based on future communication entry. For example, with the proliferation of the computer, most users have consistent typing proficiency that is not subject to major fluctuations (e.g., a user is unlikely to suddenly begin typing faster or more accurately and/or suddenly begin typing slower or less accurately, etc.). By measuring the time over which a communication is typed, the characteristics of the communication (e.g., word choice, punctuation, spelling, grammar, spacing, etc.), and the like, a profile can be generated that can be used to identify the user. Future communications may be received and compared against the profile. If the future communications match the profile, then it can be determined that the future communications were written by the same user associated with the profile.

In some examples, the computing device may connect to the server via the first communication channel. The first communication channel may include a website, socket, port, etc. of the server. The computing device may then establish a second communication channel while connected to the first communication channel. The second communication may enable communications via text, voice, video, audiovisual, etc. with the server and/or one or more terminal devices connected to the server. In some instances, the first communication channel and second communication channel may be the same (e.g., the first communication channel may enable communications via text, voice, video, audiovisual, etc. with the server and/or one or more terminal devices connected to the server).

The computing device may transmit a communication over the second communication channel. For example, the communication may include one or more alphanumeric strings. The server may receive the one or more alphanumeric strings and metadata associated with the one or more alphanumeric strings. The computing device may provide the one or more alphanumeric strings within an interface of the first communication channel. In some instances, the computing device may enter the one or more alphanumeric strings and then transmit the one or more alphanumeric strings to the server. In other instances, the interface may transmit each character as the character is entered into the interface. The metadata may include data characterizing how the one or more alphanumeric strings were provided to the interface. For instance, the metadata may indicate a first time interval corresponding to the time when the first character of the one or more alphanumeric strings is entered and when the last character of the one or more alphanumeric strings is entered. The metadata may also include a set of sub-time intervals, where each sub-time interval may correspond to a time interval over which a word of the one or more alphanumeric strings is entered into the interface. A word may correspond to a contiguous set of characters (e.g., such as defined by American Standard Code for Information Interchange (ASCII), UTC-8, etc.) positioned between a first space and a second space and that does not include any spaces. In some examples, the metadata may include information associated with the computing device such as, but not limited to, hardware and/or software installed on the computing device, an Internet Protocol (IP) address, a media access control (MAC) address, a location of the computing device, an internet service provider connecting the computing device to the Internet or to the server, combinations thereof, or the like.

The server may generate a feature vector that characterizes the one or more alphanumeric strings and the metadata. The server may then determine if the feature vector matches a user profile associated with an identified user (e.g., name, a user name, an unknown user that previously connected or communicated with the server, etc.). In some instances, the server may use a distance algorithm or clustering algorithm that determines a degree in which the feature vector matches features of a user profile. Examples of algorithms that may be used include, but are not limited to Hamming distancing, Euclidean distancing, Manhattan distancing, Minkowski distancing, hierarchical clustering, spectral clustering, density-based spatial clustering, k-means, fuzzy clustering, or the like. The features of the feature vector may be weighted based on predictiveness metric (e.g., a degree in which a feature is predictive of an identity of a user). For example, some features may be highly predictive (e.g., such as a commonly misspelled word, typing speed, etc.), while other features may be less predictive (e.g., spacing, font, etc.). The weights applied may be defined based on a machine-learning model, information associated previous comparisons of feature vectors to user profiles, user input, etc. For instance, the server may use as multivariate feature importance algorithm to derive the weights based on a set of previous instances in which a feature vector was matched to a user profile and the accuracy of each matching. Examples of such feature importance algorithms include, but are not limited to gini importance, permutation feature importance, absolute importance, main factor importance, etc.).

In other instances, the server may use a trained machine-learning model to identify a matching user profile using the feature vector as input. The machine-learning model may be a single or multivariate classifier trained using supervised learning, unsupervised learning, self-supervised learning, reinforcement learning, or the like. Examples of machine-learning models that may be used include, but are not limited to, decision trees, support vector machines, random forest, gradient boosted trees, k-means, k-nearest neighbors, Naïve Bates, a regression-based model (e.g., linear, logistic, etc.), linear discriminant analysis, vector quantization, adaptive boosting, combinations thereof, or the like. The feature vector may be passed as input into the machine-learning model and the machine-learning model may output an identification of a user profile that is a closest match to the input feature vector and an indication of a degree in which the output user profile matches the input feature vector (e.g., a confidence value).

If the feature vector matches a user profile (e.g., based on the distance algorithm, clustering algorithm, machine-learning model, etc. identifying a matching user profile with a distance or degree of confidence within a threshold value), then the server may modify first communication channel and/or the second communication channel using the user profile and update the user profile using the feature vector. For example, the sever may connect an automated service associated with the user (e.g., a personalized communication bot, etc.), modify graphical user interfaces based on user preferences or to be more accessible (e.g., based on the user's disabilities, etc.), connect the computing device with a particular terminal device or agent thereof (e.g., such as an agent that previously communicated with the user or an agent with experience in an issue associated with the user, etc.), tailor an experience of the user (e.g., adjust how communications are generated for the user including, but not limited to, language, spelling, slang, abbreviations, grammar, etc.), provide access to functions of the server, combinations thereof, or the like.

If the feature vector does not match a user profile, the server may generate a new user profile using the feature vector such that subsequent communications from the user can be used to identify the user.

In some instances, the user profile may be generated for a bot. For example, a bot (e.g., similar to an automated service, etc.) may be used to scrape information from various information sources (e.g., such as a database crawler, web crawler, etc.). The bot may be configured to simulate a human so as gain unauthorized access to networks and/or data sources. The server may generate a user profile for bots to detect communications transmitted by bots. If the server determines that a closest matching user profile is a user profile associated with a bot, the server may terminate the connection with the bot to prevent unauthorized access of functions or sensitive information of the server.

FIG. 1 illustrates an example system for identifying a user associated with a communication session according to aspects of the present disclosure. System 100 may be configured to provide customized or tailored services to identified users based on historical interactions between the user and system 100. Client devices (e.g., such as client device 104) may interact with system 100 to address an issue associated with a domain (e.g., an enterprise system, company, etc.) such as, but not limited to, execute a query associated with a product or service provided by the domain, execute a query associated with an account or user profile associated with the client device and managed by or associated with the domain, acquire or return a product or service provided by the domain, settle an account balance, etc. In some examples, the domain may include domain server 108, which may enable client devices to interact with the domain. For example, domain server 108 may host or be associated with a website, include interfaces to enable communications with the domain (e.g., over voice, text, video, audiovisual, etc.), interfaces to enable data transfer between client devices and the domain, etc. The domain may be connected to a communication network (e.g., one or more interconnected devices such as, but not limited to, mobile devices, computing devices, servers, databases, etc.) configured to provide communication services on behalf of the domain such as, but not limited to, call centers, virtual agents or other automated services, machine-learning models configured for various data processing operations, communication interfaces configured to allow for multiple, parallel communication channels, graphical user interfaces, etc. Alternatively, one or more of the communication services may be provided by the domain (e.g., via domain server 108 and/or one or more other domain servers). In those instances, domain server 108 may include the functionality of communication network 120.

A user may operate client device 104 (e.g., a mobile device such as a smartphone, desktop or laptop computer, tablet, telephone, etc.) to establish a connection with domain server 108 (e.g., a server of a particular domain, etc.) to resolve an issue associated with a product or service provided by the domain, execute queries, executing functions of the domain, etc. The connection may be a voice-based connection (e.g., such as telephone call, voice-over-IP, etc.), an audio-visual based connection, text-based connection (e.g., text messaging, direct messaging, instant messaging through an interface of a webpage or a stand-alone client, direct messaging, email, etc.), and/or a data-based connection. For example, client device 104 may connect to a website hosted by or associated with domain server 108. In some instances, domain server 108 may request a connection with client device 104. For example, client device 104 may be connected to a webpage of the domain. Domain server 108 may establish a connection (within the webpage or through a separate communication channel) with client device 104 to provide additional information associated with a product or service viewed by client device 104.

Domain server 108 identify the user of client device 104 to customize the connection, the communication session, and/or communications transmitted to client device 104. Domain server 108 may store user profiles corresponding to users that connect to the website or connect through other communication channels (e.g., telephone, instant messaging, video conference, etc.). The user profiles may include guest profiles (e.g., associated with unknown users that have connected to domain server 108, etc.) and user profiles associated with identified users (e.g., such as a name of the user, a user name, a user identifier, etc.). In some examples, domain server 108 may request access credentials (e.g., username and/or password, etc.) from client device 104 usable to identify the user profile and the user of client device 104. In other examples, domain server 108 may use communications received from client device 104 to identify the user of client device 104. For example, domain server 108 may detect an IP and/or MAC address of client device 104 from packets transmitted with the communication and use the IP and/or MAC address to identify client device 104. When client device 104 may be operated by more than one user, using characteristics of client device 104 may not identify the particular user that may be operating client device. Domain server 108 may use communications and metadata characterizing how the communications were input to identify the user in addition to or in place of the characteristics of client device 104.

For example, the user that may be operating client device 104, may input alphanumeric strings using a keyboard (e.g., a physical keyboard, virtual keyboard, other character interface, etc.) or other input device. Domain server 108 may record the alphanumeric strings and metadata characterizing the input of the alphanumeric strings. For example, the metadata may include, but is not limited to, a first time interval corresponding to the time between a first time when a first character of the alphanumeric strings is input and a second time when a last character of the alphanumeric strings is input. The metadata may also include a set of sub-time intervals, where each sub-time interval may correspond to a time interval over which a word (e.g., a sequence of characters between spaces with no spaces being included) of the one or more alphanumeric strings is input.

For audio-based communication channels (e.g., telephone, video conference, etc.) the metadata may include voice-pattern information (e.g., speech volume, pitch, identification of vocal disfluencies, frequency of vocal disfluencies, frequency spectra of the user's voice, speech rate, etc.), etc. For visual-based communications, the metadata may include representative video frames (that can be processed by communication network 120, etc.) or processed video frames (e.g., object recognition, facial recognition, mood recognition, gesture recognition, etc. using one or more machine-learning models of communication network 120, etc.).

Domain server 108 may transmit one or more communications received from client device 104 and the metadata to communication network 120. Communication network 120 may provide a variety of services to domains including identifying a user profile associated with received communications. Communication network 120 may also provide communication services such as automating communications between a domain and client devices, establishing connections between client devices and terminal devices (e.g., operated by agents, automated services, etc.), executing functions on behalf of a domain (e.g., executing queries, resolving outstanding account balances, etc.).

Communication network 120 may be a computing device that includes a set of processing resources (e.g., central processing unit, memory, bandwidth, etc.) that can be allocated for services provided to one or more domains. In some instances, communication network 120 may be a node of a distributed architecture including a set of computing devices each including processing resources that can be allocated to the one or more domains. The services and functions of communication network 120 may be performed by a single computing device or may be distributed across multiple computing devices (e.g., such as cloud network configuration, or the like).

In some examples, communication network 120 may identify users upon receiving a request from domain server 108. Domain server 108 may transmit the request to identify a user with the communications, metadata, and an identification of the domain associated with domain server 108. Communication network 120 may pass the request to domain identifier, which may identify a set of user profiles associated with the domain of domain server 108 (e.g., reducing the quantity of possible user profiles that may match the communications). The request and identification of the set of user profiles may then be passed to execution engine 124, which may identify an automated service of automated services 128 to satisfy the request.

Automated services 128 may include one or more machine-learning models and/or other processes configured to execute functions of communication network 120. The one or more machine-learning models may include a first machine-learning model configured to process incoming communications to identify users and generate communication fingerprints (e.g., a data structure characterizing communications of a user and usable to identify a user from arbitrary communications received from the user). The first machine-learning model may be a single or multivariate classifier trained using supervised learning, unsupervised learning, self-supervised learning, reinforcement learning, or the like. Examples of machine-learning models that may be used include, but are not limited to, decision trees, support vector machines, random forest, gradient boosted trees, k-means, k-nearest neighbors, Naïve Bates, a regression-based model (e.g., linear, logistic, etc.), linear discriminant analysis, vector quantization, adaptive boosting, combinations thereof, or the like. The first machine-learning model may output an identification of a user profile that is a closest match to an input feature vector and an indication of a degree in which the output user profile matches the input feature vector (e.g., a confidence value). Automated services 128 may include other machine-learning models configured to process communications (e.g., natural language understanding (NULL) machine-learning models, speech-to-text models, text-to-speech models, etc.), generate natural language communications (e.g., using large language model such as a transformer, generative adversarial networks, etc.), generate predictions and/or perform classifications, generate feature weights, etc.

Execution engine 124 may be configured to train the machine-learning model of automated services 128 and manage the execution of the machine-learning models and other processes of automated services 128. Execution engine 124 may train the machine-learning models using supervised learning, unsupervised learning, semi-supervised learning, self-supervised learning, reinforcement learning, combinations thereof, or the like based on the particular machine-learning model being trained. Execution engine 124 may direct feature extractor 136 to generate training datasets for the machine-learning model to be trained. Feature extractor 136 may generate training datasets using training data 132 based on the type of machine-learning model being trained. Training data 132 may store historical communication and identification data, manually and/or procedurally generated communication and identification data, previously generated training datasets, and/or the like. In some instances, feature extractor 136 generate hybrid training datasets that include a combination of historical communications received from the user and manual and/or procedurally generated training data when the quantity of historical communications received from the user is insufficient to train a machine-learning model. Communication network 120 may continue storing communications received from the user during this communication session and subsequent communication session. Once training data 132 includes a sufficient quantity of historical communications from the user to train the machine-learning models (e.g., at a threshold accuracy metric, etc.), execution engine 124 may retrain the machine-learning model (e.g., or instantiate and train a new machine-learning model) using the historical communications from the user, Each machine-learning model may be trained for a predetermined time interval or until one or more accuracy metrics reach threshold values. Examples of accuracy metrics include, but are not limited to, accuracy, recall, F1 score, confusion matric, logarithmic loss, mean absolute error, mean squared error, area under the curve (ROC), and/or the like. In some instances, execution engine 124 and/or user input may be used to select the particular accuracy metrics to be used for a particular machine-learning model and correspond thresholds indicative of a passing accuracy. The machine-learning models may also be trained using reinforcement learning with each execution of the machine-learning models and/or after termination of the connection with client device 104. Reinforcement learning may enable the machine-learning models to learn from each attempt to identify the user from the communications and metadata, which may improve the accuracy of the machine-learning models.

Execution engine 124 may direct feature extractor 136 to generate feature vectors for the trained machine-learning models to process. For example, execution engine 124 may pass the request (e.g., the communications, metadata, etc.) to feature extractor 136 and feature extractor 136 may generate a feature vector for the first machine-learning model. Generating the feature vector may include dimensionality reduction (e.g., using principal component analysis, or the like), interpolation to generate additional or missing data, feature selection (e.g., using a feature importance algorithm, or the like), normalization, and/or the like. For example, feature extractor may first remove extraneous and/or superfluous data, then select and weight features based on a feature importance algorithm to generate a feature vector. Feature extractor 136 may pass the feature vector to automated services 128, which may execute the first machine-learning model. The first machine-learning model may output an identification of a user profile of the set of user profiles that is a closest match to the feature vector and a confidence value indicative of a degree in which the feature vector matches the identified user profile. The output may be passed to execution engine 124, which may pass the output to domain server 108. If the confidence value is below a threshold (indicative of the identified user profile not really being a match for the feature vector), then execution engine 124 treat the feature vector as characterizing communications of a new user. Execution engine 124 may store the feature vector as a new user profile along with any information received from domain server 108 as part of the request. Execution engine 124 may also transmit the feature vector to domain server 108 for storage in user profiles 116.

In some examples, communication network 120 may use a statistical analysis of the communication, metadata, and the set of user profiles to identify a matching user profile without using machine-learning. In those examples, communication network 120 may use a distance algorithm or clustering algorithm that determines a degree in which the feature vector matches features of a user profile. Examples of algorithms that may be used include, but are not limited to Hamming distancing, Euclidean distancing, Manhattan distancing, Minkowski distancing, hierarchical clustering, spectral clustering, density-based spatial clustering, k-means, fuzzy clustering, or the like. The features of the feature vector may be weighted based on predictiveness metric (e.g., a degree in which a feature is predictive of an identity of a user). For example, some features may be highly predictive (e.g., such as a commonly misspelled word, typing speed, etc.), while other features may be less predictive (e.g., spacing, font, etc.). The weights applied may be defined based on a machine-learning model, information associated previous comparisons of feature vectors to user profiles, user input, etc. For instance, the server may use as multivariate feature importance algorithm to derive the weights based on a set of previous instances in which a feature vector was matched to a user profile and the accuracy of each matching. Examples of such feature importance algorithms include, but are not limited to gini importance, permutation feature importance, absolute importance, main factor importance, etc.).

For example, the user profile may include a communication fingerprint that characterizes how a user has previously communicated with the domain. In some instances, a communication fingerprint (and/or a user profile) may be generated for a bot (e.g., an automated communication process configured to simulate a human to gain unauthorized access to the functions of the communication network or sensitive information of the communication network). The communication fingerprint may include, but is not limited to, an indication of a language used, commonly used words, spelling (e.g., frequently misspelled words and how the words are misspelled, commonly used acronyms, commonly used slang, commonly used abbreviations, commonly used grammar, commonly used punctuation, commonly used spacing, commonly used font, typing speed, sentence length (e.g., quantity of words and/or syllables, etc.), communication length (e.g., quantity of word, syllables, and/or sentences typed before transmitting the communication, etc.), combinations thereof, or the like. The user profile may be updated each time communications are received from a same user (e.g., regardless of whether that user is known or unknown to communication network 120). Communication network 120 may receive a communication from the user including one or more alphanumeric strings and compare the one or more alphanumeric strings and identify the closest matching communication fingerprint (e.g., using machine-learning, statistical analysis, etc.). For example, communication network 120 may determine that the one or more alphanumeric strings (and corresponding metadata) include misspelled words that were misspelled in a same manner as an identified by a particular communication fingerprint, that the one or more alphanumeric strings were input at a similar input speed as the particular communication fingerprint and using similar grammar, punctuation, etc. Communication network 120 may then determine that the user profile corresponding to the particular communication fingerprint likely corresponds to the user.

In some instances, such as when sever 120 may provide communication services for domain server 108, execution engine may use the output to customize services for particular users using communication interface 138. For instance, communication network 120 may customize graphical user interfaces or communication interfaces (e.g., text windows, webpages, etc.) for a particular user. Communication network 120 may also establish or intercept a communication session (e.g., such as the connection established by client device 103 through which the communications were received, etc.) to connect client device 104 to one or more virtual agents (e.g., an automated service configured to simulate an agent when communicating with users) or terminal device 140 operated by an agent of communication network 120 operating on behalf of the domain. In some instances, communication network 120 may, based on the output, may establish the communication session over a parallel communication session. For instance, client device 104 may communicate with domain server 108 via a chat window of a website of the domain. Communication network 120, upon determining the identity of the user of client device 104, may request to communicate over an alternative communication channel more preferable to the user such as over a telephonic connection, video conferencing, etc.

Communication network 120 may instantiate an automated communication service (e.g., a virtual agent configured to simulate a human agent when communicating with users) to communicate via communication interface 138 with client device 104. Communication network 120 may instantiate general automated communication service or automated communication service trained to tailor communications to particular users. The automated communication service may be trained to communicate with the particular user in a manner that simulates a human agent. The automated communication service may customize generated communications to the user based on the communications received from the user (e.g., preferred language, font, diction, punctuation, grammar, etc.). The automated communication service may include one or more natural language understanding machine-learning models and/or one or more large language models configured to process communications received from the user, generate a response, and translate the response into a form or format customized to the user.

In some instances, the automated communication service may be configured to communicate over any communication channel (e.g., data, instant messaging, text, email, voice, video conference, etc.). In those instances, the automated communication service may include one or more audio-to-text converters (e.g., configured to convert voice communications into corresponding alphanumeric text, etc.), one or more natural language processors (e.g., configured to convert natural language into machine-readable instructions and convert machine-readable instructions into natural language text), one or more large language models (e.g., configured to process the machine-readable instructions and generate natural language and/or machine-readable responses), one or more text-to-voice converters (e.g., converting text responses into a synthetic voice, etc.), one or more animators (e.g., configured to generate a visual representation of the automated communication service synchronized with the synthetic voice, etc.), and/or the like. The automated communication service may be configured to communicate with the user using natural language communications simulating an agent of domain server 108 (e.g., such that the user may not immediately realize that the user is communicating with a non-human process). The automated communication service may include a dynamically configurable processing pipeline configured activate and/or disable components and route communications to components to enable processing any type of incoming communications and generate communications in any output form or format. For example, communications received over instant messaging may cause the automated communication service to disable the voice-to-text converter and route communications directly to the natural language processor or the large language model, etc.

In some examples, communication network 120 and/or domain server 108 may modify the connection with client device 104 based on the identification of the user. For instance, communication network 120 may dynamically modify the website (e.g., such as objects and/or components presented, language, content, etc.), modify communications (e.g., customized communications, select communication language, etc.), establish new communication channels (e.g., establish a telephonic connection, video conference, etc.), terminate communication channels (e.g., terminate instant messaging channel, etc.), connect automated communication services (e.g., such as large language models, virtual agents, etc. configured for autonomous communications with users), connect agents and/or terminal devices, combinations thereof, or the like.

Communication network 120 and/or domain server 108 may store the communications received during the connection with client device 104. The communications may be processed to update the user profile associated with the current user of client device 104. For example, the communications maybe be used to generate and/or update user preference (e.g., such as preferred communication channels, preferred communication characteristics such as language and slang, user interface preferences, content preferences, etc.) such that subsequent connections to domain communication network 120 by the user can be further customized to the contemporaneous preferences of the user. The communications may also be processed to generate user profiles (if a user profile has not already been generated) and/or the communication fingerprint of the user profile.

In some examples, the communication-based identification may be used to identify malicious communication services such as bots attempting to gain unauthorized access to communication network 120, domain server 108, or the corresponding domain. Communication network 120 may communication fingerprints associated with bots that have previously communicated with communication network 120 or attempted to access communication network 120. If a communication is received and matched to a communication fingerprint associated with a bot (using any of the aforementioned processes). Communication network 120 may prevent further access to the bot by, for example, terminating the communication session with the bot, closing one or more device ports, increasing security, report information associated with the bot or the communication received by the bot (e.g., a location of the device executing the bot, an IP address, a MAC address, packet information, etc.), generating fake information (e.g., procedurally and/or manually) usable continue to communications with the bot without comprising data of communication network 120 (e.g., to gather more information about the bot without the bot detecting that communication network 120 detected the bot, etc.), combinations thereof, or the like.

Figure 2:
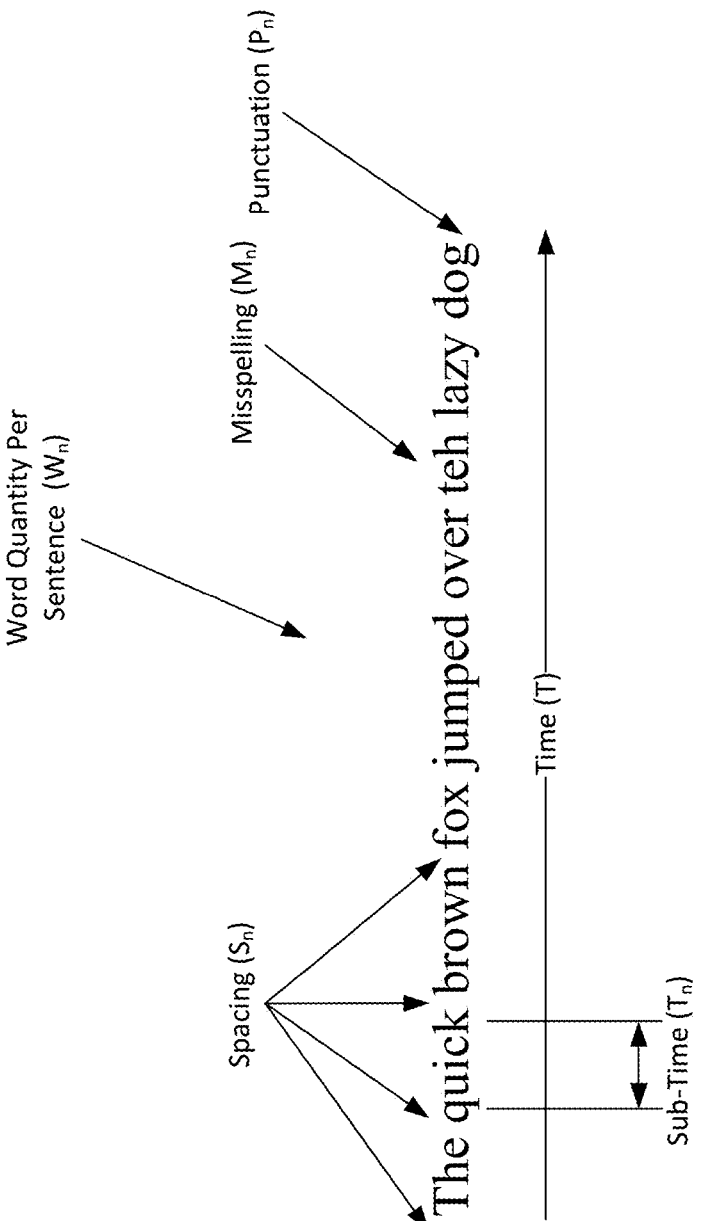
FIG. 2 illustrates an example block diagram representing feature extraction from alphanumeric communications according to aspects of the present disclosure.

FIG. 2 illustrates an example block diagram representing feature extraction from alphanumeric communications according to aspects of the present disclosure. Alphanumeric communications may include an ordered set of characters (e.g., ASCII, UTC-8, etc. based characters or the like) representing a word, phrase, sentence, etc. input one or more characters at a time using a hardware or software interface of a client device (e.g., such as client device 104 of FIG. 1). A computing device (e.g., such as communication network 120 of FIG. 1, etc.) may receive the communication along with metadata characterizing the communication and/or the client device. The computing device may derive a feature vector from the communication and the metadata.

The features of the set of features may include, but are not limited to, an indication of a communication type (e.g., text, voice, video conference, etc.), an identification of an input source (e.g., such as, but not limited to, a keyboard, mouse, touchpad, scanner, gamepad, microphone with a speech-to-text converter, virtual input device, etc.), an overall time interval T indicating the time between receiving a first character of the set of characters and receiving a last character of the set of characters, an input rate (e.g., a rate in which communications are input by the user such as a speech rate or typing rate, etc.), a set of sub-time intervals $T_n$ with each sub-time interval corresponding to the time between receiving a first character after a space character and receiving a character that precedes a space character (e.g., a time interval in which a discrete word within the set of characters is input), a quantity of words included in phrases or sentences or the set of characters $W_n$ (e.g., identified by tokenization identify sets of characters separated by successive spaces), average spacing of each phrase or sentence, etc. $S_n$, an identification of misspelled words $M_n$ (e.g., based on a dictionary comparison or machine-learning model, etc.), punctuation usage $P_n$ (an indication of punctuation usage expressed as a Boolean, a score indicative an accuracy of punctuation usage, as integer indicating frequency of punctuation usage per communication, etc.), input rate $T_r$, grammar (e.g., a score derived from a degree of accuracy of grammar usage, etc.), a list of words included in the set of characteristics (excluding semantically irrelevant words such articles or the like), semantic intent (e.g., semantic classification of words, phrases, sentences, communications, etc.), an identification abbreviations (e.g., based on a statistical classification of abbreviations use frequency, etc.), identification of slang use, client device characteristics (e.g., hardware and/or software installed within the client device, a geolocation of the client device, etc.), network information of the client device (e.g., such an IP address, MAC address, an Internet Service Provider (ISP), an identification other devices connected to a same network as client device, a geolocation of the client device, etc.), combinations thereof, or the like.

The semantic analysis may use one or more use a dictionary comparison to determine a meaning of words and phrases as well as identify those words that are misspelled. The meaning of words and phrases can be aggregated to infer the meaning of sentences and/or the communication. Alternatively, the computing device may use a natural-language-understanding (NLU) machine-learning model trained to classify a meaning and/or intended meaning of the words, phrases, sentences, and/or the communication. Alternatively, the computing device may not perform semantic analysis and instead use characteristics of the communication for the identification.

The computing device may use the feature vector to identify a closest matching communication fingerprint. The communication fingerprint may be a data structure storing a scalable set of features. The set of features may include, but is not limited to, input rate, word size (e.g., average quantity of characters per word excluding semantically irrelevant words such as articles, etc.), sentence length (e.g., average quantity of words per sentence, etc.), a list of preferred words and phrases (e.g., words with a frequency of use greater than a threshold, etc.), communication length (e.g., average quantity of words included in set of characters, etc.), a list of misspelled words (including the misspelled version of the word), average spacing between words, average spacing between sentences, grammar (e.g., an average score indicative of accurate grammar use, etc.), punctuation (e.g., an average score indicative of accurate punctuation use, etc.), etc.

In some examples, the computing device may use a statistical matching algorithm such as a distance algorithm (as previously described) to identify a closest matching communication fingerprint. In other examples, the computing device may use a trained machine-learning model (e.g., such as a single or multivariate classifier, etc.). The computing device may determine that the author of the set of characters corresponds to the user associated with the communication fingerprint based on the degree (or confidence) in which the feature vector corresponds to the closest matching communication fingerprint being greater than a threshold.

Once a matching communication fingerprint is identified, the computing device may update the communication fingerprint using the feature vector. Some feature types stored by the communication fingerprint may be appended with additional features each time additional features corresponding to the feature type is identified in a new communication. For example, the communication fingerprint may include a list of frequently misspelled words (with an indication of the words are misspelled). New misspelled words included in the set of characters may be added to the list. Some feature types may be modified based on the features of the feature vector. For example, input rate may be updated by deriving an average input rate (and/or a median, mode, etc.) from each input rate derived from each communication received from the user. In some instances, the computing device may remove individual input rates that may be inaccurate (e.g., such as those input rates greater than a threshold, which may be indicative of the user pausing, etc.).

The communication fingerprint may be updated each time a new communication (e.g., a set of characters) is received from the user and until the communication session is terminated. Once the communication session is terminated, the communication fingerprint may be stored in a repository of communication fingerprints. Alternatively, the computing device may generate the feature vector from a sampling of communications received during the communication session. By sampling a large quantity of communications, the computing device may more accurately identify a closest matching communication fingerprint at the expense of time. The computing device may derive the feature vector from a sample of predetermined quantity of communications. Once the predetermined quantity of communications received during the communication session, the computing device may identify the closest matching communication fingerprint.

Figure 3:
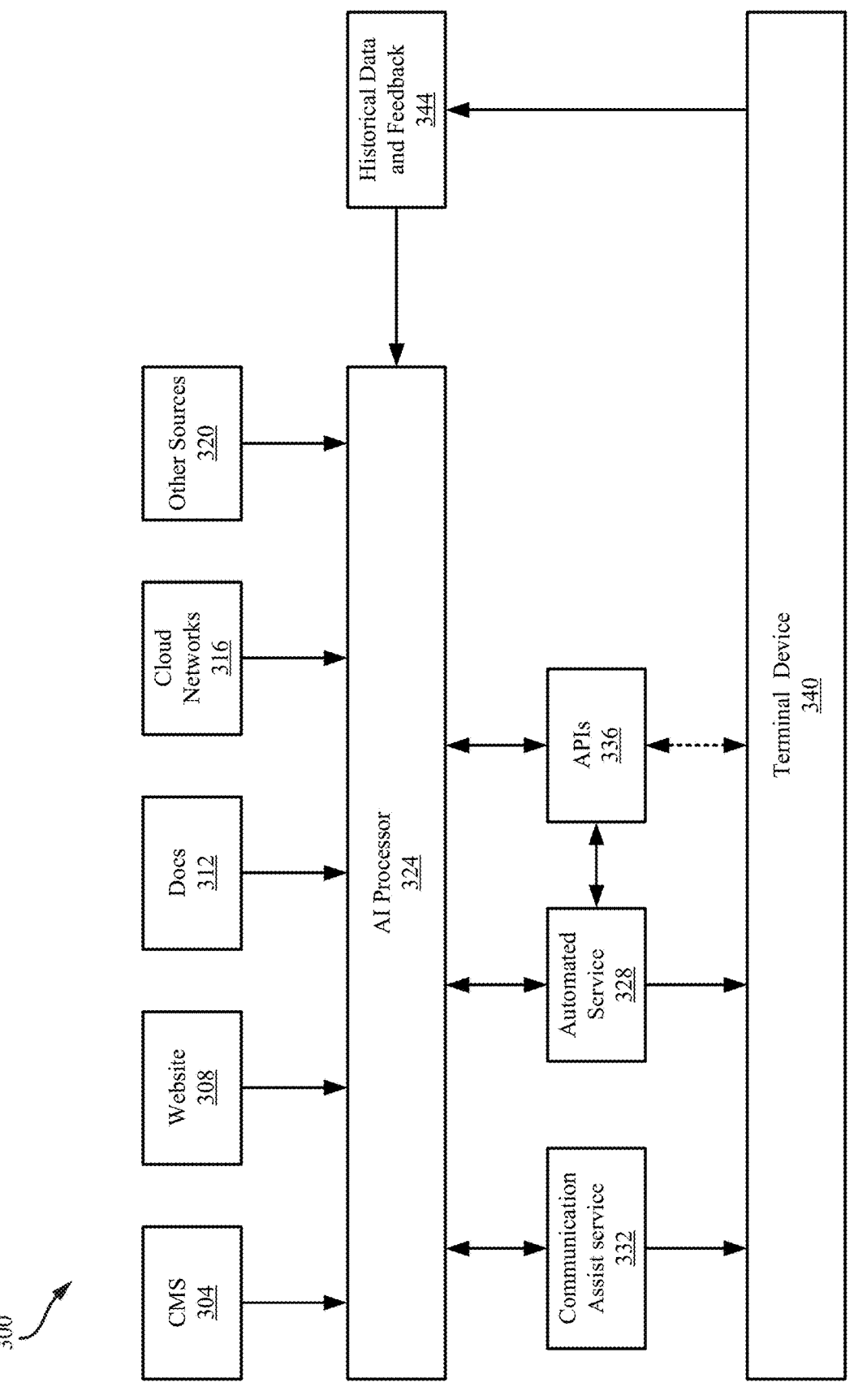
FIG. 3 depicts a block diagram of an example artificial-intelligence data processing system configured to automate communications for client devices based on an identification of a user operating the client device according to aspects of the present disclosure.

FIG. 3 depicts a block diagram of an example artificial-intelligence data processing system of an automated service configured to automate communications of a communication network according to aspects of the present disclosure. Artificial-intelligence data processing system 300 may be configured to facilitate and maintain communications between an agent of a communication network and an automated service, between an agent of a communication network and a user, between a user and an automated service, and/or the like. Artificial-intelligence data processing system 300 may customize communications with particular users based on the identity of the user (e.g., such as historical communications between the user and artificial-intelligence data processing system 300, etc.). Client devices (e.g., operated by users) may connect to the communication network using a variety of different device types and capabilities to request assistance to perform an action (e.g., execute a query for information, pay a balance, communicate with a customer service agent, receive technical support, etc.). The communication network may automate some or all of the communications transmitted to client devices. The communication network may facilitate and maintain communications using artificial-intelligence data processing system 300, which can, for example, connect the client device to automated service 328 or to a terminal device operated by an agent assisted by communication assist service 332.

Artificial-intelligence data processing system 300 may be a component of one or more computing devices (e.g., terminal devices, mobile devices, telephones, desktop or laptop computers, servers, databases, etc.) that operate within a communication network (e.g., such as communication network 120 of FIG. 1). In some instances, an instance of artificial-intelligence data processing system 300 may be a component of one or more computing devices of the communication network or of one or more computing devices operating separately from the communication (e.g., such as via external terminal devices configured to provide services one or more communication networks, an application or service executing on client devices operated by users, etc.). The one or more computing devices may connect to the communication network to enable the communication network to route communications between a client device and the instance of artificial-intelligence data processing system 300 operating separately from the communication network or may connect to the communication to access data to facilitate operations of the instance of artificial-intelligence data processing system 300. In some instances, multiple artificial-intelligence data processing systems may be instantiated, each including different capabilities and being configured to communicate with different device types and/or users. For instance, each artificial-intelligence data processing system 300 may be trained to communicate with users who speak different language or operate different processing devices. The communication network may route communications received from a client device to a particular instance of artificial-intelligence data processing system 300 based on a degree in which the instance of artificial-intelligence data processing systems 300 matches the client device and/or an availability of the instances of artificial-intelligence data processing system 300.

Artificial-intelligence data processing system 300 may receive data from a variety of disparate information sources for use training and executing automated services. Examples of information sources include, but are not limited to, content management systems 304, websites 308, documents 312 (e.g., via a document management system, concurrent versioning system, file system, database, etc.), cloud networks 316, communication networks (e.g., one or more devices configured to facilitate communications over one or more communication channels between users and other users and/or between users and agents), terminal devices (e.g., devices configured to communicate with client devices, etc.), other sources 320 (e.g., analytics services, Internet-of-Things (IoT) devices, databases, servers, any other information source or storage device, etc.), sensor-based devices (e.g., device including sensors and/or devices connected to sensors, etc.), and/or the like.

Artificial-intelligence data processing system 300 may receive data from data sources 304-120 using a process defined based on the data source. For example, some data sources such as IoT devices may transmit a data stream to which artificial-intelligence data processing system 300 may connect. For some data sources, artificial-intelligence data processing system 300 may transmit a request for particular data and/or for datasets stored by a data source. Artificial-intelligence data processing system 300 may transmit requests in regular intervals (e.g., such as a batch request to one or more data sources, etc.), upon detecting or being notified of new data, and/or the like. For some data sources. artificial-intelligence data processing system 300 may use one or more APIs exposed by a data source (or by artificial-intelligence data processing system 300) to access data generated or stored by data source. For some data sources, artificial-intelligence data processing system 300 may instantiate a process configured to scrape data from a data source (e.g., such as web crawler, etc.). The process may execute to access and transmit data of a data source to artificial-intelligence data processing system 300. Some data sources may transmit data to artificial-intelligence data processing system 300 each time new data is generated and/or stored by the data source. Some data sources may transmit data continuously as a data stream that devices such as the artificial-intelligence data processing system can connect. Alternatively, or additionally, some data sources may broadcast the data stream to devices configured to or adapted to receive the data stream (e.g., such as the artificial-intelligence data processing system, etc.). artificial-intelligence data processing system 300 and/or data sources may include a registration processes usable to enable access to the data of a respective data source by artificial-intelligence data processing system 300. The registration process may indicate the particular process usable by artificial-intelligence data processing system 300 or a respective data source facilitate access to the data of the respective data source.

Data of a data source can include any type of information. Some data may correspond to information associated with an object (e.g., software object, etc.), product or service provided by the communication network or associated domain, an entity, a topic, an account associated with the user managed by the communication network, etc. that may be requested by a user. Some data sources may store records, documents, files, images, videos, audio recording, or the like. For example, a data source may store a record of a previous conversation (e.g., in an audio format, alphanumeric format, or the like) between a user and an agent. Another data sources may store sensor data from one or more connected sensors (e.g., such as motion sensors, temperature sensors, etc.).

Data from data sources may be received by AI processor 324. AI processor 324 may be configured to process the data into a format usable by one or more conversation services (e.g., automated services 328, communication assist service 332, APIs 336, and/or the like) and/or information-distribution services. AI processor 324 may include one or more devices, processes, machine-learning models, and/or the like configured to process received data and derive additional information (e.g., such as additional data and/or data types, semantic information, contextual information, etc.) from the received data. The received data and the additional information may be stored for use by the conversational services, the user, and/or an agent.

AI processor 324 may preprocess the data to convert the received data into one or more general formats. AI processor 324 may identify a data type associated with the received data (e.g., based on identifying audio data, video data, alphanumeric strings, a particular file type extension, etc.) and allocate a process and/or machine-learning model capable of processing that data type. For example, if the received data includes audio segments from voice communications, AI processor 324 may allocate a machine-learning model configured to process audio segments such as a recurrent neural network, or the like (e.g., for a speech-to-text translation, audio classification, etc.). For video segments, AI processor 324 may allocate machine-learning models configured to classify images, perform object detection, etc. AI processor 324 may then store the preprocessed data.

In some instances, AI processor 324 may augment the preprocessed data by adding additional features corresponding to contextual information, metadata, etc. For example, AI processor 324 may identify contextually relevant information based on, but not limited to, information associated with the origin device from which the data was transmitted and/or a user thereof (e.g., such as, but not limited to, demographic information, location information, an identification of hardware and/or software included within the origin device, an Internet Protocol (IP) address, a media access control address (MAC), etc.), information associated with the communication that included the information (e.g., such as an IP address, a MAC address, an identification of an origin location of the communication, an identification one or more servers through which the communication traveled, a data size and/or packet size, a quantity of packets, etc.), information associated with preceding or subsequently received data, information associated with linked data (e.g., data referenced by the data to be stored, or data that references the data to be stored, etc.), semantic information, and/or the like. AI processor 324 may extract features from the augmented data to add to the preprocessed data. Alternatively, or additionally, AI processor 324 may determine which features to add to the preprocessed data based on a classification of the data to be stored (e.g., such as audio or text-based conversation data, video data, information data, etc.).

AI processor 324 may receive requests for information from automated service 328, communication assist service 332, and APIs 336. Automated service 328 may include one or more processes, machine-learning models, and/or devices configured to communicate with client devices, terminal devices, other device, and/or other automated services over text-based or audio-based communication channels. Automated service 328 may communicate with users and/or agents using automatically generated natural language communications. In some instances, automated services 328 may be configured to communicate in a manner such that a user or agent operating terminal device 340 may not detect that automated service 328 is not a human. For example, automated service 328 may be configured to generate responses that are based on a same orthography and/or communication convention (e.g., language, diction, grammar, slang, abbreviations, gestures, etc.) as used by the user or agent. Alternatively, automated service 328 may be configured to generate responses that are based on an orthography and/or communication convention commonly used when communicating over the communication channel of the communication session and based on demographic information associated with the human users with which automated service 328 is communicating. For example, when communicating with an English-speaking user over an instant messaging communication channel, automated service 328 may generate natural-language, English communications an orthography or communication convention acceptable for communicating over instant messaging (e.g., using appropriate abbreviations, diction, sentence structure, punctuation, etc.). Automated service 328 may be configured to communicate over an audio interface (e.g., a telephone call, etc.), a video interface (e.g., video conference, etc.), one or more textual interfaces (e.g., text messaging, instant messaging, email, direct messaging, and/or the like), or the like.

In some instances, automated service 328 may request information from AI processor 324 during a communication session with a user and/or other automated service. For example, during the communication session, a user may ask a question. Automated service 328 may parse the question to determine a question type, identify information that will resolve the question, an interface type of the interface through which automated service 328 is communicating with the user, and/or one or more contextually relevant features that may increase an accuracy of the response that will be generated by automated service 328. Automated service 328 may then execute a query to automated service 328 for the information.

AI processor 324 may receive the query and identify data associated with one or more potential responses to the query. AI processor 324 may then generate one or more potential responses (e.g., using a large language model, deep learning network, etc.) In some instances, AI processor 324 may generate a confidence value for each of the one or more potential responses that includes the requested information. The confidence value may be generated based on a degree in which a potential response matches the query (e.g., based on a quantity of features of the potential response that correspond to the query, or the like). AI processor 324 may then rank the one or more potential responses and identify a particular potential response having a highest confidence value. Alternatively, AI processor 324 may identify a set of potential responses of the one or more potential responses having a confidence value greater than a threshold.

AI processor 324 may then translate the response into a representation that can be transmitted via the communication channel connecting client device to automated service 328. For example, if the user is communicating with automated service 328 via a telephonic interface (e.g., voice-based communications, etc.), then AI processor 324 may translate the particular response into one or more alphanumeric strings that include a natural language representation of the information with a diction, grammar, etc. that may be tailored to the user based on the demographic information of the user. AI processor 324 may then translate the one or more alphanumeric strings into a synthetic voice representation that may be presented by automated service 328.

Automated service 328 may include one or more machine-learning models configured to process input from terminal device 340. The one or more machine-learning models may be selected based on a communication channel over which the communications may be received. For instances, text communications may be processed by a classifier, audio communications may be processed by a recurrent neural network, video communications may be processed by a convolutional neural network (e.g., configured to process video channel such as the video frames) and/or one or more recurrent neural networks (e.g., configured to process the audio channel and to retain information for subsequent iterations of the convolutional neural network or recurrent neural network, etc.), etc. Automated service 328 may utilize other machine-learning models to perform other operation associated with the communication session such as, but not limited to, classifiers, pattern analysis, root-cause analysis, solution analysis, etc. AI processor 324 may select the one or more machine-learning models that may be configured to assist terminal device 340 based on the communication channel and characteristics of the communication session (e.g., device or service associated with the communication session, reported issue, etc.).

In some instances, automated service 328 may include a sequence of machine-learning models that operate together to process incoming communications, generate responses, and transmit the responses to the user or agent over the same communication channel over which the incoming communications were received. The machine-learning models may be trained using training datasets derived from data that correspond to historical communications transmitted over similar communication channels. Each training dataset may include a sequence (e.g., ordered) or set (e.g., unordered) of data usable to train a particular machine-learning model (e.g., recurrent neural network, Naive Bayes, etc.) to generate a target output (e.g., predictions, classifications, image processing, audio processing, video processing, natural language processing, generative, etc.).

In some instances, additional features may be added to the training datasets to augment the semantic meaning of the data of the training datasets and/or to provide context usable by the automated service to generate subsequent communications. The additional data may correspond to features extracted from other portions of the training dataset, features associated with a source of the training datasets (e.g., features that correspond to a data source or device, features that identify the data source, etc.), features associated with a user that generated or is associated with the data of the training datasets, an identification of a data type of the data of the training datasets, a timestamp corresponding to when the data of the training datasets was generated and/or received, combinations thereof, or the like.

AI processor 324 may select one or more training datasets for each machine-learning model based on the target output for that machine-learning model. The communication network may the modify the training datasets to optimally train a particular machine-learning to generate a particular target output.

The AI processor 324 may then train the machine-learning models to generate a target output. The one or more machine-learning models may be trained over a training time interval that may be based on a predetermined time interval or based on a target accuracy of the machine-learning model. For example, the training time interval may begin when training begins and end when a target accuracy metric is reached (e.g., accuracy, precision, area under the curve, logarithmic loss, F1 score, mean absolute error, mean square error, etc.). The machine-learning models may be trained using supervised learning, unsupervised learning, semi-supervised learning, reinforcement learning, combinations thereof, or the like. The type of training to be used may be selected based on the type of machine-learning model being trained. For instance, a regression model may use supervised learning (or a variation thereof), while a clustering model may be trained using unsupervised learning (or a variation thereof), etc. Alternatively, the type of learning may be selected based on the target output and/or a type or quality of the training data available to train the machine-learning models.

Once the one or more machine-learning models are trained, AI processor 324 may define processes and/or interfaces configured to connect the one or more machine-learning models to enable a single input to generate an output expected by terminal device 340. For example, a first communication may be received from a communication-impaired user. The processes and/or interfaces enable the one or more machine-learning models to operate together to, for example: detect a communication from the user (e.g., via a text-based interface, audio-based interface, audiovisual-based interface, etc.), classify the communications, execute a query to obtain information for a response to the communication (if additional information or external information is needed or requested), generate a natural language response (e.g., via a large language model, diffusion model, generative adversarial network, a natural language understanding machine-learning model, etc.),transmit the natural language response to the a terminal device for agent review or directly to the user (depending on the configuration). Alternatively, one or more of the aforementioned machine-learning models or algorithms may be combined into a single machine-learning model. The processes and/or interfaces may enable the output of one machine-learning model to be used as input into another machine-learning model by processing the output into a different form or format (e.g., if needed) and into a format expected by a next machine-learning model in the sequence. The AI processor 324 may define multiple processes and/or interfaces to organize the one more machine-learning models into difference sequences configured to process different forms of communication (e.g., speech, gesture-based communications, data, text, etc.) received over different communication channels (e.g., videoconference, telephone, text, data, etc.). As a result, each of the processes and/or interfaces may structure the one or more machine-learning models in various configurations and sequences based on the communication channel and communications transmitted over the communication channel.

Communication assist service 332 may include one or more processes and/or devices configured to assist an agent during a communication session between a user and an agent or automated service 328 and an agent. For example, communication assist service 332 may be an automated service (e.g., such as automated service 328) with a modified output layer that presents one or more outputs of an automated service to the human agent (rather than automatically transmitting the output to the agent or user). The agent may then select an output from the one or more outputs and present it to the user. As a result, during a communication session, communication assist service 332 may operate in a same or similar manner as automated service 328. Communication assist service 332 may operate continuously throughout a communication session with a user to provide one or more suggested responses to each communication transmitted by user. The agent may determine how to use the information generated by communication assist service 332. For example, the agent may present an unedited version of the response generated by communication assist service 332, present a modified version of the response, present an alternative response, etc.

Communication assist service 332 may present responses in a simplified grammatical representation, such as a short-hand, that can be translated by the agent. Alternatively, the information may be presented in a formal grammatical format (e.g., including a particular sentence structure, wording/phrasing, grammar, punctuation, etc. that is native to the communication network being used).

In instances in which multiple responses are generated, communication assist service 332 may rank or score each response so as to provide the agent with options that may be selectively presented over the communication session. The rank or scores may be based on one or more algorithms configured to maximize a probability that particular event will occur (e.g., such as resolving a user issue or complaint, providing a response to a query, causing the user to sign up for a service, causing the user to generate a new profile, cause the user to purchase an item, etc.). A score may include a probability value corresponding to the probability that a particular event may occur if a particular response is selected, an indication in which the probability value will change if a particular response is selected, etc.

APIs 336 may include a set of interfaces exposed to terminal device 340, automated service 328, and/or other devices authorized to access AI processor 324. The set of interfaces may allow terminal device 340 to execute functions of AI processor 324, such as, but not limited to establishing communications between terminal device 340 and other devices or services, establish connection contexts, modify connection contexts, execute queries for information, etc. The APIs may be wrapped within an application configured to execute functions of the APIs. Alternatively, the application may connect to APIs 336 or execute remote calls to the functions of APIs 336. The application may include graphical user interfaces and/or command line interfaces that enable terminal device 340 to selectively execute the functions of APIs 336. APIs 336 may include one or more APIs accessible via different interface types usably by terminal device 340.

In some instances, APIs may be accessible to devices operating within a same communication network as AI processor 324 (e.g., terminal devices, etc.). Devices outside the communication network may lack the capability and/or authorization to access APIs. External devices may connect to automated service 328 and request the execution of functions of AI processor 324. Automated service 328 may receive the request, determine if the request should be authorized (e.g., based on the requesting device and/or a user thereof, etc.), and define one or more function calls from APIs 336 that will implement the requested functionality.

Terminal device 340 may generate one or more metrics corresponding to the communication session between terminal device 340 and/or an agent thereof and a client device and/or a user thereof, terminal device 340 and automated service 328, automated service 328 and another automated service 328, terminal device 340 operating communication assist service 332 and a client device or automated service 328, terminal device 340 and AI processor 324 via APIs 336, a client device and automated service 328, and/or any other communications of a service involving AI processor 324. The one or more metrics may be manually generated (e.g., by a user, agent, or the like) and/or automatically generated (e.g., by a communication application, automated service 328, communication assist service 332, AI processor 324, etc.) based on the occurrence of events during the communication session, an analysis of communications transmitted and/or received, a satisfaction of the user or agent, etc. For example, the one or more metrics may include an indication of an accuracy of a response to a communication transmitted by a user or agent (e.g., indicating a degree with which AI processor 324 identified the correct information), a degree in which communications conformed to the communication channel used for the communication session (e.g., indicating whether communications used an appropriate conversational standard associated with the communication channel), and/or the like. The one or more metrics may be transmitted to historical data and feedback 344.

Historical data and feedback 344 may store records of communication sessions (e.g., the one or more metrics, communications transmitted to and/or received by terminal device 340, feedback from the user, feedback from the agent, feedback from the automated service 328, and/or the like) between terminal device 340 and client devices. Historical data and feedback 344 may use the records of one or more communication sessions to define one or more feature vectors usable to train the machine-learning models of AI processor 324. The feature vectors may be used for reinforcement learning and/or to train new machine-learning models based on the historical communications and the one or more metrics and/or feedback generated from those communications. In some instances, labels may be derived from the one or more metrics and/or feedback generated from the communications for supervised learning, semi-supervised learning, reinforcement learning, etc.). Machine-learning models may be trained for predetermined time interval, for a predetermined quantity of iterations, until a predetermined accuracy metric (e.g., accuracy, precision, area under the curve, logarithmic loss, F1 score, mean absolute error, mean square error, etc.) is reached, and/or the like. The one or more metrics and/or feedback may be used to determine an on-going quality of the output of a machine-learning model. If the one or more metrics and/or feedback indicate that the quality of a machine-learning model is below a threshold, then historical data and feedback 344 may retrain the machine-learning model, instantiate and train a new machine-learning model, and/or the like.

In some instances, the feature vectors may be used for reinforcement learning and/or other types of on-going learning. In those instances, a trained machine-learning model used during a communication session to generate a response (e.g., by translating a potential response into a natural-language response native to a particular communication channel) may execute a reinforcement-learning iteration using the feature vector used to generate the response, the one or more metrics, and one or more thresholds to qualify the one or more metrics. The reinforcement-learning iteration may adjust internal weights of the machine-learning model to bias the machine-learning model towards or away from generating particular responses. If the one or more metrics associated with a response are high relative to the one or more thresholds (e.g., indicating the response is correlated with a positive or accurate result), then reinforcement learning may bias the machine-learning model to generate responses similar to that response. If the one or more metrics associated with a response are low relative to the one or more thresholds (e.g., indicating the response is correlated with a poor or inaccurate result), then reinforcement learning may bias the machine-learning model to generate responses different from that response.

FIG. 4 illustrates a flowchart of example process of identifying a source of a communication and using the identification to generate tailored responses according to aspects of the present disclosure. At block 404, a computing device (e.g., a component of a communication network such as communication network 120, etc.) may receive, over a first time interval, a communication from a first client device. The communication may be received over a communication channel established between the first client device and a terminal device, the first client device and the computing device, the first client device and another device, etc. The communication channel may be configured to facilitate communications of a particular type (e.g., text-based, audio-based, audiovisual-based, etc.). For example, the communication channel may be configured for verbal communications, instant messaging, email, text messaging, direct messaging, video conferencing, etc. In some examples, the communication may include one or more alphanumeric strings.

At block 408, the computing device may extract a set of features from the communication, wherein the features correspond to characteristics indicative of how portions of the communication are generated by the client device over the first time interval. Examples of the features of the set of features may include, but are not limited to, an indication of a communication type (e.g., text, voice, video conference, etc.), an identification of an input source (e.g., such as, but not limited to, a keyboard, mouse, touchpad, scanner, gamepad, microphone, virtual input device, etc.), an overall time interval indicating the time between receiving a first character of the one or more alphanumeric strings and receiving a last character of the one or more alphanumeric strings, an input rate (e.g., a rate in which communications are input by the user such as a speech rate or typing rate, etc.), a set of sub-time intervals with each sub-time interval corresponding to the time between receiving a first character after a space character and receiving a character that precedes a space character (e.g., a time interval in which a discrete word within the one or more alphanumeric strings is input), a quantity of words included in phrases or sentences or the one or more alphanumeric strings (e.g., identified by tokenizing a contiguous set of characters separated by successive spaces), average spacing of each phrase or sentence $S_n$, an identification of misspelled words and how the words spelled (e.g., based on a dictionary comparison or machine-learning model, etc.), punctuation usage (an indication of punctuation usage expressed as a Boolean, a score indicative of an accuracy of punctuation usage, as integer indicating frequency of punctuation usage per communication, etc.), grammar (e.g., a score derived from a degree of accuracy of grammar usage, etc.), a list of words included in the set of characteristics (excluding semantically irrelevant words such as articles or the like), semantic intent (e.g., semantic classification of words, phrases, sentences, communications, etc.), an identification abbreviations (e.g., based on a statistical classification of abbreviations use frequency, etc.), identification of slang use, characteristics of the first client device (e.g., hardware and/or software installed within the client device, a geolocation of the client device, etc.), network information of the client device (e.g., such an IP address, MAC address, an Internet Service Provider (ISP), an identification other devices connected to a same network as client device, a geolocation of the client device, etc.), combinations thereof, or the like.

At block 412, the computing device may execute a machine-learning model using the set of features, the machine-learning model may be configured to generate a predicted identity (e.g., author) associated with a source (e.g., a user, automated service, agent, etc.) of the communication. The machine-learning model compare the set of features to a repository of communication fingerprints, each communications fingerprint characterizing the communications of a particular user. The machine-learning model may output an identification of the user (or automated service) associated with the communication fingerprint that is a closest match to the set of features. The machine-learning model may also output a confidence value indicative of the degree in which the set of features corresponds to the communication fingerprint. If the confidence value is greater than a threshold, then the user (or automated service) associated with the communication fingerprint may be output as the predicted identify of the source (e.g., author) of the communication. Alternatively, or additionally, the computing device may use a distance algorithm to identify a closest matching communication fingerprint.

At block 416, the computing device may generate an interface based on the predicted identity of the source, the interface can include additional information associated with the source of the communication. The interface may be an input/output interface, graphical user interface, hardware interface, network interface, or the like. The interface may be a customized version of an interface presented and/or available to the client device and configured to tailor communications generated by the computing device, a terminal device, an automated service, etc. to the identified source. For example, the interface may be a graphical user interface including executable objects (e.g., buttons, menus, links, etc.) selected based on the identity of the source. For another example, the interface may be a communication interface through which the computing device may connect the client device to an automated service (e.g., such as a communication bot, etc.) configured to automatically communicate with the source. The automated service may be generated for the identified source so as to tailor communications based on information known about the identified source (e.g., historical communications transmitted by the identified source, demographic information, hardware and/or software characteristics of the client device, etc.). For example, the automated service may tailor communications based on an age of the identified source and a language previously used by the source to generate communications that make the automated service appear as a human that is the same age as the identified source.

At block 416, the computing device may transmit a response to the communication via the communication channel, the response being tailored to the source based on the additional information of the interface. For example, the automated service, through the interface, may transmit a response to the client device for the identified source. The response being tailored to the identified source.

Figure 5:
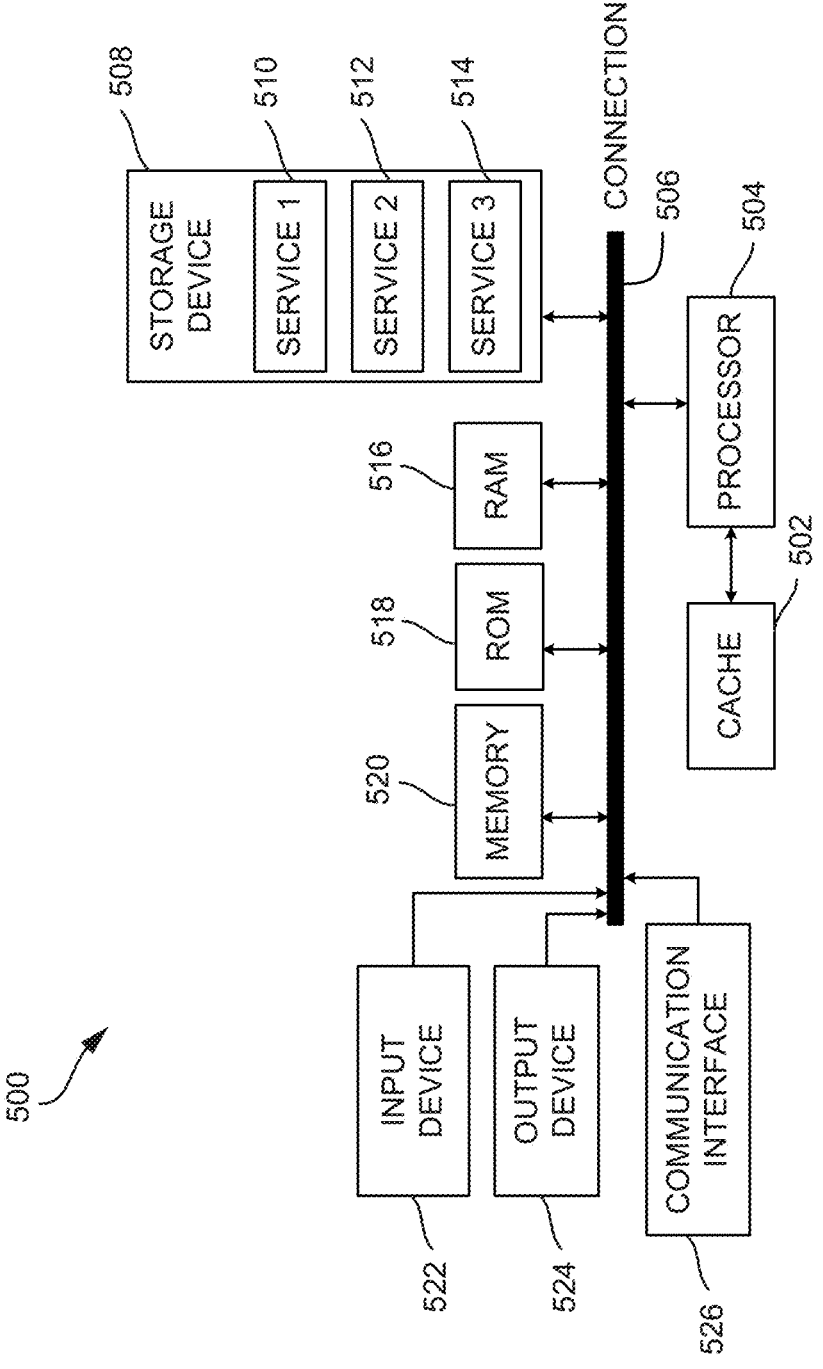
FIG. 5 illustrates an example computing system architecture including various components in electrical communication with each other and configured to implement aspects of the present disclosure.

FIG. 5 illustrates an example computing system architecture including various components in electrical communication with each other and configured to implement aspects of the present disclosure. FIG. 5 illustrates a computing system architecture 500 including various components in electrical communication with each other using a connection 506, such as a bus, in accordance with some implementations. Example computing system architecture 500 includes a processing unit (CPU or processor) 504 and a system connection 506 that couples various system components including the system memory 520, such as ROM 518 and RAM 516, to the processor 504. The computing system architecture 500 can include a cache 502 of high-speed memory connected directly with, in close proximity to, or integrated as part of the processor 504. The computing system architecture 500 can copy data from the memory 520 and/or the storage device 508 to the cache 502 for quick access by the processor 504. In this way, the cache can provide a performance boost that avoids processor 504 delays while waiting for data. These and other modules can control or be configured to control the processor 504 to perform various actions. Other system memory 520 may be available for use as well. The memory 520 can include multiple different types of memory with different performance characteristics. The processor 504 can include any general-purpose processor and a hardware or software service, such as service 1510, service 2 512, and service 3 514 stored in storage device 508, configured to control the processor 504 as well as a special-purpose processor where software instructions are incorporated into the actual processor design. The processor 504 may be a completely self-contained computing system, containing multiple cores or processors, a bus, memory controller, cache, etc. A multi-core processor may be symmetric or asymmetric.

To enable user interaction with the computing system architecture 500, an input device 522 can represent any number of input mechanisms, such as a microphone for speech, a touch-sensitive screen for gesture or graphical input, keyboard, mouse, motion input, speech and so forth. An output device 524 can also be one or more of a number of output mechanisms known to those of skill in the art. In some instances, multimodal systems can enable a user to provide multiple types of input to communicate with the computing system architecture 500. The communications interface 526 can generally govern and manage the user input and system output. There is no restriction on operating on any particular hardware arrangement and therefore the basic features here may easily be substituted for improved hardware or firmware arrangements as they are developed.

Storage device 508 is a non-volatile memory and can be a hard disk or other types of computer readable media which can store data that are accessible by a computer, such as magnetic cassettes, flash memory cards, solid state memory devices, digital versatile disks, cartridges, RAMs 516, ROM 518, and hybrids thereof.

The storage device 508 can include services 510, 512, 514 for controlling the processor 504. Other hardware or software modules are contemplated. The storage device 508 can be connected to the system connection 506. In one aspect, a hardware module that performs a particular function can include the software component stored in a computer-readable medium in connection with the necessary hardware components, such as the processor 504, connection 506, output device 524, and so forth, to carry out the function.

The following examples are examples of various aspects of the disclosure. As used below, any reference to a series of examples is to be understood as a reference to each of those examples disjunctively (e.g., "Examples 1-4" is to be understood as "Examples 1, 2, 3, or 4").

Example 1 is a method comprising: receiving, over a first time interval, a communication via a first communication channel from a first device; extracting a set of features from the communication, wherein features of the set of features correspond to characteristics indicative of how portions of the communication are generated by the client device over the first time interval; executing a machine-learning model using the set of features, the machine-learning model generating a predicted identity associated with a source of the communication; generating an interface based on the predicted identity of the source, the interface including additional information associated with the source of the communication; and transmitting a response to the communication via the first communication channel, the response being tailored to the source based on the additional information of the interface.

Example 2 is the method of example(s) 1, wherein the additional information includes an identifier of the source.

Example 3 is the method of any of example(s) 1-2 and 4-9, wherein the additional information includes an identification of other communications received from the source.

Example 4 is the method of any of example(s) 1-3 and 5-9, wherein the communication includes alphanumeric characters.

Example 5 is the method of any of example(s) 1-4 and 6-9, wherein the communication includes voice communications.

Example 6 is the method of any of example(s) 1-5 and 7-9, wherein the set of features includes characteristics of user interaction derived during one or more web-browsing sessions.

Example 7 is the method of any of example(s) 1-6 and 8-9, further comprising: determining that a confidence value generated by the machine-learning model is less than a threshold; and transmitting, via the first communication channel, a request to confirm the predicted identity of the source of the communication.

Example 8 is the method of any of example(s) 1-7 and 9, wherein the request to confirm the predicted identity of the source of the communication includes a two-factor authentication process.

Example 9 is the method of any of example(s) 1-8, wherein the first device is restricted from access to information associated with the source of the communication.

Example 10 is a system comprising: one or more processors; and a machine-readable storage medium that stores instructions that when executed by the one or more processors, cause the one or more processors to perform the methods of any of example(s)s 1-9.

Example 11 is a non-transitory machine-readable storage medium that stores instructions that when executed by one or more processors, cause the one or more processors to perform the methods of any of example(s)s 1-9.

The disclosed methods and systems can be implemented using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a client device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example, and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor. The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the terms "computer readable medium", "computer readable storage medium", "machine-readable medium" and "machine-readable storage medium" should be taken to include a single medium or multiple media (e.g., a centralized or distributed database, and/or associated caches and servers) that store the one or more sets of instructions. The terms "computer readable medium", "computer readable storage medium", "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not that are not expressly included or may return to a previous step and continue (e.g., repeating some or all of the process). A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a keypad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method comprising:
   receiving, over a time interval, a communication via a communication channel from a device;
   extracting a set of features from the communication, wherein features of the set of features correspond to characteristics indicative of how portions of the communication are generated by the device over the time interval;
   executing a machine-learning model using the set of features, the machine-learning model generating a predicted identity of a user of the device;
   facilitating a connection of a terminal device to a communication session based on the predicted identity of the user, wherein the terminal device is selected based on a previous communication session between the terminal device and the user, and wherein the terminal device is configured to communicate with the device over the communication channel; and
   facilitating a transmission of a response to the communication by the terminal device via the communication channel, the response being tailored to the user of the device based on historical communications associated with the device.

2. The method of claim 1, further comprising:

generating an interface based on the predicted identity of the user of the device, the interface including additional information associated with the user of the device, wherein the additional information includes an identifier of the user of the device.

3. The method of claim 1, further comprising:

generating an interface based on the predicted identity of the user of the device, the interface including additional information associated with the user of the device, wherein the additional information includes an identification of other communications received from the user of the device.

4. The method of claim 1, wherein the communication includes alphanumeric characters.

5. The method of claim 1, wherein the communication includes voice communications.

6. The method of claim 1, wherein the set of features includes characteristics of user interaction derived during one or more web-browsing sessions.

7. The method of claim 1, further comprising:

determining that a confidence value generated by the machine-learning model is less than a threshold; and executing a two-factor authentication process by transmitting a sequence via an alternative communication channel to verify the predicted identity.

8. A system comprising:

one or more processors; and a machine-readable storage medium storing instructions that when executed by the one or more processors, cause the one or more processors to perform operations including:

receiving, over a time interval, a communication via a communication channel from a device;

extracting a set of features from the communication, wherein features of the set of features correspond to characteristics indicative of how portions of the communication are generated by the device over the time interval;

executing a machine-learning model using the set of features, the machine-learning model generating a predicted identity of a user of the device;

facilitating a connection of a terminal device to a communication session based on the predicted identity of the user, wherein the terminal device is selected based on a previous communication session between the terminal device and the user, and wherein the terminal device is configured to communicate with the device over the communication channel; and facilitating a transmission of a response to the communication by the terminal device via the communication channel, the response being tailored to the user of the device based on historical communications associated with the device.

9. The system of claim 8, wherein the operations further include:

generating an interface based on the predicted identity of the user of the device, the interface including additional information associated with the user of the device, wherein the additional information includes an identifier of the user of the device.

10. The system of claim 8, wherein the operations further include:

generating an interface based on the predicted identity of the user of the device, the interface including additional information associated with the user of the device, wherein the additional information includes an identification of other communications received from the user of the device.

11. The system of claim 8, wherein the communication includes alphanumeric characters.

12. The system of claim 8, wherein the communication includes voice communications.

13. The system of claim 8, wherein the set of features includes characteristics of user interaction derived during one or more web-browsing sessions.

14. The system of claim 8, further comprising:

determining that a confidence value generated by the machine-learning model is less than a threshold; and executing a two-factor authentication process by transmitting a sequence via an alternative communication channel to verify the predicted identity.

15. A non-transitory machine-readable storage medium storing instructions that when executed by one or more processors, cause the one or more processors to perform operations including:

receiving, over a time interval, a communication via a communication channel from a device;

extracting a set of features from the communication, wherein features of the set of features correspond to characteristics indicative of how portions of the communication are generated by the device over the time interval;

executing a machine-learning model using the set of features, the machine-learning model generating a predicted identity of a user of the device;

facilitating a connection of a terminal device to a communication session based on the predicted identity of the user, wherein the terminal device is selected based on a previous communication session between the terminal device and the user, and wherein the terminal device is configured to communicate with the device over the communication channel; and facilitating a transmission of a response to the communication by the terminal device via the communication channel, the response being tailored to the user of the device based on historical communications associated with the device.

16. The non-transitory machine-readable storage medium of claim 15, wherein the operations further include:

generating an interface based on the predicted identity of the user of the device, the interface including additional information associated with the user of the device, wherein the additional information includes an identifier of the user of the device.

17. The non-transitory machine-readable storage medium of claim 15, wherein the operations further include:

generating an interface based on the predicted identity of the user of the device, the interface including additional information associated with the user of the device, wherein the additional information includes an identification of other communications received from the user of the device.

18. The non-transitory machine-readable storage medium of claim 15, wherein the communication includes alphanumeric characters.

19. The non-transitory machine-readable storage medium of claim 15, wherein the communication includes voice communications.

20. The non-transitory machine-readable storage medium of claim 15, wherein the set of features includes characteristics of user interaction derived during one or more web-browsing sessions.

* * * * *